United States Patent
Kim et al.

(10) Patent No.: US 9,197,095 B2
(45) Date of Patent: Nov. 24, 2015

(54) WIRELESS POWER CHARGING APPARATUS AND METHOD OF CHARGING THE APPARATUS

(71) Applicant: Electronics and Telecommunications Research Institute, Daejeon (KR)

(72) Inventors: Myung Hoi Kim, Daejeon (KR); Jae Hoon Kim, Daejeon (KR); Do Seob Ahn, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 38 days.

(21) Appl. No.: 14/163,966

(22) Filed: Jan. 24, 2014

(65) Prior Publication Data
US 2014/0206384 A1    Jul. 24, 2014

(30) Foreign Application Priority Data

Jan. 24, 2013 (KR) .................. 10-2013-0008088
Aug. 1, 2013 (KR) .................. 10-2013-0091510

(51) Int. Cl.
| H02J 7/02 | (2006.01) |
| H04W 64/00 | (2009.01) |
| H02J 5/00 | (2006.01) |
| H02J 17/00 | (2006.01) |

(52) U.S. Cl.
CPC ............... *H02J 7/025* (2013.01); *H02J 5/005* (2013.01); *H02J 17/00* (2013.01); *H04W 64/00* (2013.01); *Y02B 40/90* (2013.01); *Y02B 60/50* (2013.01)

(58) Field of Classification Search
None
See application file for complete search history.

(56) References Cited

U.S. PATENT DOCUMENTS

| 2009/0146608 | A1* | 6/2009 | Lee .............................. 320/108 |
| 2009/0264069 | A1* | 10/2009 | Yamasuge ................... 455/41.1 |
| 2010/0201313 | A1* | 8/2010 | Vorenkamp et al. .......... 320/108 |
| 2011/0043163 | A1 | 2/2011 | Baarman |
| 2011/0057606 | A1* | 3/2011 | Saunamaki ................... 320/108 |
| 2011/0115432 | A1* | 5/2011 | El-Maleh et al. ............. 320/108 |
| 2013/0154557 | A1* | 6/2013 | Lee et al. ...................... 320/108 |
| 2013/0154558 | A1* | 6/2013 | Lee et al. ...................... 320/108 |
| 2015/0002086 | A1* | 1/2015 | Matos et al. .................. 320/108 |

FOREIGN PATENT DOCUMENTS

KR    10-2012-0132773 A    12/2012

* cited by examiner

*Primary Examiner* — Kimberly A Williams

(57) ABSTRACT

A wireless power charging apparatus and method are provided, which recognizes location information of at least one wireless power receiving apparatus; selects at least one of at least one wireless power transmitter that supplies power to the at least one wireless power receiving apparatus based on the location information; and supplies power to the at least one wireless power receiving apparatus through the at least one selected wireless power transmitter.

18 Claims, 11 Drawing Sheets

WIRELESS POWER CHARGING APPARATUS AND METHOD OF CHARGING THE APPARATUS

CROSS-REFERENCE TO RELATED APPLICATIONS

This application claims the benefit of Korean Patent Application No. 10-2013-0008088 filed on Jan. 24, 2013 and of Korean Patent Application No. 10-2013-0091510 filed on Aug. 1, 2013, in the Korean Intellectual Property Office, the disclosures of which are incorporated herein by reference.

BACKGROUND

1. Field of the Invention

The present invention relates to a wireless power charging apparatus and method, and more particularly, to a location-based wireless power charging apparatus and method.

2. Description of the Related Art

With development of a technology of mobile devices such as a smart phone and a smart pad, a lifestyle of modern society is significantly changing. In particular, with respect to the mobile device technology, wirelessness and mobility are emphasized and accordingly user convenience is being maximized. According to such a tendency, an interest is increasing in a wireless charging technology related to power charging with respect to the mobile device.

The wireless charging technology may mainly include an electromagnetic induction method and a magnetic resonance (MR) method.

The electromagnetic induction method enables a non-contacting type power contact point, easily implements an apparatus, and also enables a small size of the apparatus. According to the electromagnetic induction method, charging efficiency is relatively low and a distance between power receiving and transmitting devices is relatively short in consideration of in-air emission of power. Although the MR method may achieve relatively high charging efficiency at a remote distance, a leakage of emitted power may affect a human body and the influence is not ignorable. Thus, since those wireless power charging methods have merits and demerits, respectively, a combined use of those methods is necessary.

In general, power charging of a mobile device is performed indoors, such as at home or in a café, an office, or a car. As aforementioned, various charging methods may be combinedly used for efficient wireless charging. However, it is difficult for a user to select a proper charging method in consideration of all conditions such as power efficiency and an influence to the human body. Furthermore, users generally wish power charging to be performed more freely and unconsciously than when designating a charging place.

Accordingly, there is a need for a technology of recognizing a location of a mobile device which needs charging and achieving optimal power transmission, to increase user convenience and charging efficiency while reducing an influence affecting a human body.

SUMMARY

According to an aspect of the present invention, there is provided a wireless power charging apparatus including at least one wireless power transmitter to supply power to at least one wireless power receiving apparatus, a location recognizer to recognize location information of the at least one wireless power receiving apparatus, and a controller to select at least one of the at least one wireless power transmitter based on the location information, and control the at least one selected wireless power transmitter to supply power to the at least one wireless power receiving apparatus.

The location recognizer may recognize a change in the location information by a real time polling method or an interrupt method.

The location recognizer may recognize the location information using near frequency communication (NFC), image recognition, a piezoelectric and electric field change sensor, triangulation using a wireless local area network (WLAN), and global positioning system (GPS) information.

The controller may analyze capability information of the at least one wireless power transmitter and selects at least one of the at least one wireless power transmitter based on an analysis result.

The controller may analyze charging efficiency and a body harm rate of the at least one wireless power transmitter based on the capability information, and select at least one of the at least one wireless power transmitter in consideration of the charging efficiency and the body harm rate.

The controller may select at least one of the at least one wireless power transmitter so that the charging efficiency is maximized.

The controller may select at least one of the at least one wireless power transmitter so that the body harm rate is minimized.

The controller may monitor whether the location information is changed according to a movement of the wireless power receiving apparatus, and select at least one of the at least one wireless power transmitter again based on the changed location information when the location information is changed.

The controller may analyze environment information of the wireless power receiving apparatus, and select at least one of the at least one wireless power transmitter again in consideration of the changed environment information when the environment information is changed.

According to another aspect of the present invention, there is provided a wireless power charging apparatus including at least one wireless power transmitter to supply power to at least one wireless power receiving apparatus, a location recognizer to recognize location information of the at least one wireless power receiving apparatus, and at least one controller connected to the at least one wireless power transmitter, wherein the at least one controller determines whether to supply power to the at least one wireless power receiving apparatus by the connected wireless power transmitter based on the location information.

According to still another aspect of the present invention, there is provided a wireless power charging apparatus including at least one wireless power transmitter to supply power to at least one wireless power receiving apparatus, a location recognizer connected to the at least one wireless power transmitter to recognize location information of the connected wireless power receiving apparatus individually, and at least one controller connected to the at least one wireless power transmitter, wherein the at least one controller determines whether to supply power to the at least one wireless power receiving apparatus by the connected wireless power transmitter based on the location information.

According to yet another aspect of the present invention, there is provided a wireless power charging method including recognizing location information of at least one wireless power receiving apparatus, selecting at least one of at least one wireless power transmitter that supplies power to the at least one wireless power receiving apparatus based on the location information, and supplying power to the at least one wireless power receiving apparatus through the at least one selected wireless power transmitter.

According to further another aspect of the present invention, there is provided a wireless power charging method including connecting at least one wireless power transmitter which supplies power to at least one wireless power receiving apparatus with at least one controller, recognizing location information of the at least one wireless power receiving apparatus, determining whether to supply power to the at least one wireless power receiving apparatus by the connected wireless power transmitter using the at least one controller based on the location information, and supplying power to the at least one wireless power receiving apparatus through the at least one wireless power transmitter determined to supply power.

According to still further another aspect of the present invention, there is provided a wireless power charging method including connecting at least one wireless power transmitter to supply power to at least one wireless power receiving apparatus, a location recognizer to recognize location information of the at least one wireless power receiving apparatus, and at least one controller with one another, recognizing the location information of the at least one wireless power receiving apparatus using the location recognizer, determining whether to supply power to the at least one wireless power receiving apparatus by the connected wireless power transmitter using at least one controller based on the location information, and supplying power to the at least one wireless power receiving apparatus through the at least one wireless power transmitter determined to supply power.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
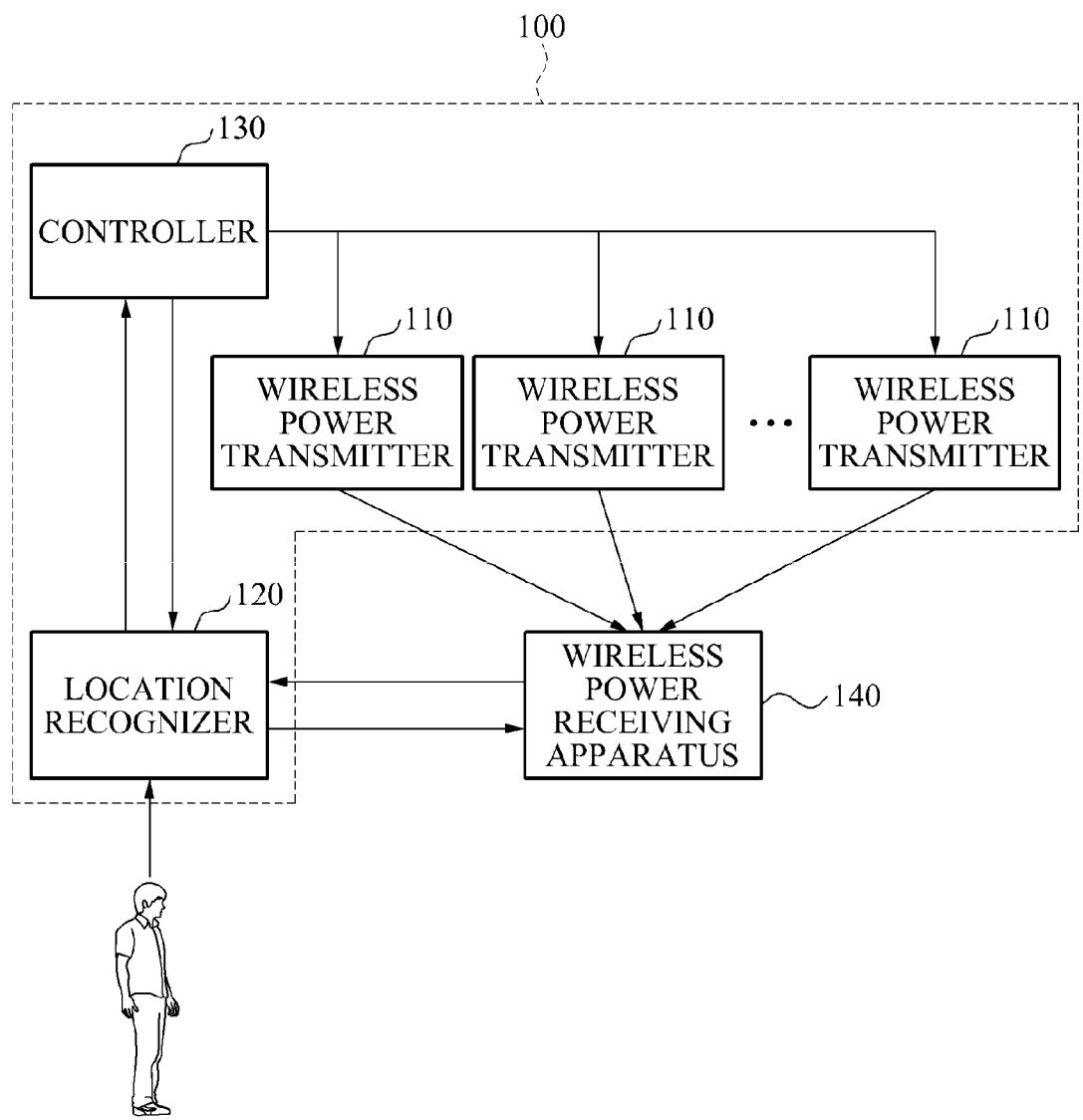
FIG. 1 is a block diagram illustrating a configuration of a wireless power charging apparatus according to an embodiment of the present invention.

Reference will now be made in detail to exemplary embodiments of the present invention, examples of which are illustrated in the accompanying drawings, wherein like reference numerals refer to the like elements throughout.

In the description of the present invention, if detailed descriptions of related disclosed art or configuration are determined to unnecessarily make the subject matter of the present invention obscure, they will be omitted. Terms to be used below are defined based on their functions in the present invention and may vary according to users, user's intentions, or practices. Therefore, the definitions of the terms should be determined based on the entire specification.

A wireless power charging apparatus and method according to embodiments of the present invention may provide an apparatus and method providing a wireless power charging service based on location recognition and location tracking. In addition, the wireless power charging apparatus and method may stereoscopically recognize and track an indoor location and a location change of mobile devices such as a mobile communication terminal, a tablet device, a notebook, and the like, and may perform wireless power reception and transmission stereoscopically with respect to locations of the mobile devices.

According to an aspect of the present invention, a power transmitter may be disposed fragmentally or stereoscopically on an indoor ceiling, wall, or floor, and may transmit power corresponding to characteristics and a location of a power receiving apparatus that needs power charging. Also, the power transmitter may transmit charging information and efficiency improving location information to a user. As a result, wireless power charging efficiency may be increased while harm to a human body is minimized.

FIG. 1 is a block diagram illustrating a configuration of a wireless power charging apparatus 100 according to an embodiment of the present invention.

Referring to FIG. 1, the wireless power charging apparatus 100 may supply power to any one selected from at least one wireless power transmitter 110 in consideration of a location of a wireless power receiving apparatus 140.

The wireless power charging apparatus 100 may include at least one wireless power transmitter 110, a location recognizer 120, and a controller 130.

The at least one wireless power transmitter 110 may supply power to at least one wireless power receiving apparatus 140. The location recognizer 120 may recognize location information of the at least one wireless power receiving apparatus 140. The controller 130 may select at least one from the at least one wireless power transmitter 110 based on the location information, and control the at least one selected wireless power transmitter 110 to supply power to the at least one wireless power receiving apparatus 140.

The wireless power charging apparatus according to an aspect of the present invention may recognize and track a three-dimensional (3D) location of the wireless power receiving apparatus which is applicable to a mobile terminal such as a smart phone and a smart pad, thereby supplying power to the wireless power receiving apparatus.

The wireless power charging apparatus may start power charging by recognizing entry to a charging area by the wireless power receiving apparatus. However, since the wireless power charging apparatus is capable of actively setting and controlling a power transmission method based on the 3D location recognition and tracking of the wireless power receiving apparatus, automatic power supply to the wireless power receiving apparatus may be achieved without the user having to recognize the charging area.

The wireless power receiving apparatus may be adapted to perform power charging by wirelessly receiving power supplied to a mobile terminal. The mobile terminal may include devices portable by the user during use, such as a digital broadcasting terminal, a personal digital assistant (PDA), a smart phone, a smart pad, an international mobile telecommunication (IMT)-2000 terminal, a wideband code division multiple access (WCDMA) terminal, and a universal mobile telecommunication service (UMTS) terminal, and corresponding application devices.

The wireless power charging apparatus may recognize a location and a location change of the at least one wireless power receiving apparatus 140 through the location recognizer 120. The location recognizer 120 may recognize a change in the location information by a real time polling method for recognizing the location and the location change periodically or an interrupt method for recognizing the location change only when the location change occurs.

In addition, the location recognizer 120 may recognize the location information using near frequency communication (NFC), image recognition, a piezoelectric and electric field change sensor, triangulation using a wireless local area network (WLAN), and global positioning system (GPS) information.

The controller 130 may analyze capability information of the at least one wireless power transmitter 110 and select at least one from the at least one wireless power transmitter 110 based on the analysis result.

The controller 130 may analyze charging efficiency and a body harm rate of the at least one wireless power transmitter 110 based on the capability information, and may select at least one of the at least one wireless power transmitter 110 in consideration of the charging efficiency and the body harm rate.

For example, the controller 130 may analyze the charging efficiency and the influence affecting the human body by receiving the location information and combining the location information with the capability information of the wireless power transmitter 110. In addition, the controller 130 may transmit a power transmission command to the wireless power transmitter 110.

In an example, the controller 130 may select at least one from the at least one wireless power transmitter 110 so that the charging efficiency is maximized or so that the body harm rate is minimized.

To increase the charging efficiency, the wireless power charging apparatus 100 may transmit power to one wireless power receiving apparatus 140 by driving a plurality of wireless power transmitters 110. Also, when a transmitter (not shown) including a variable beam antenna is provided, the wireless power charging apparatus 100 may transmit wireless power by actively controlling a variable beam from 3D location information.

The controller 130 may monitor whether the location information is changed according to a movement of the wireless power receiving apparatus 140. When the location information is changed, the controller 130 may select at least one of the at least one wireless power transmitter 110 again based on the changed location information.

The controller 130 may analyze environment information of the wireless power receiving apparatus 140 and, when the environment information is changed, may select at least one of the at least one wireless power transmitter 110 again in consideration of the changed environment information.

For example, the controller 130 may provide information on a current state of wireless power charging to the wireless power receiving apparatus 140. Furthermore, the controller 130 may provide updated location information for a better charge condition.

The wireless power charging apparatus 100 may apply various configurations and methods to increase the wireless power charging efficiency. For example, the wireless power transmitter 110 may apply various types according to a wireless power system. Specifically, for example, the wireless power transmitter 110 may include a power generator and a coil or antenna for emitting generated power. In addition, the wireless power transmitter 110 may transmit power based on various power transmission methods such as an electromagnetic induction method or a magnetic resonance method.

The wireless power charging apparatus 100 may be configured in various combinations depending on a wireless power transmission method, an installation place, a price, a purpose, and the like. The wireless power transmitter 110 may be disposed stereoscopically, for example on an indoor ceiling, a floor, a table, and a wall, thereby stereoscopically performing wireless power transmission.

FIG. 1 illustrates an embodiment of the wireless power charging apparatus 100 configured to control the wireless power transmitter 110 in a center.

Figure 2:
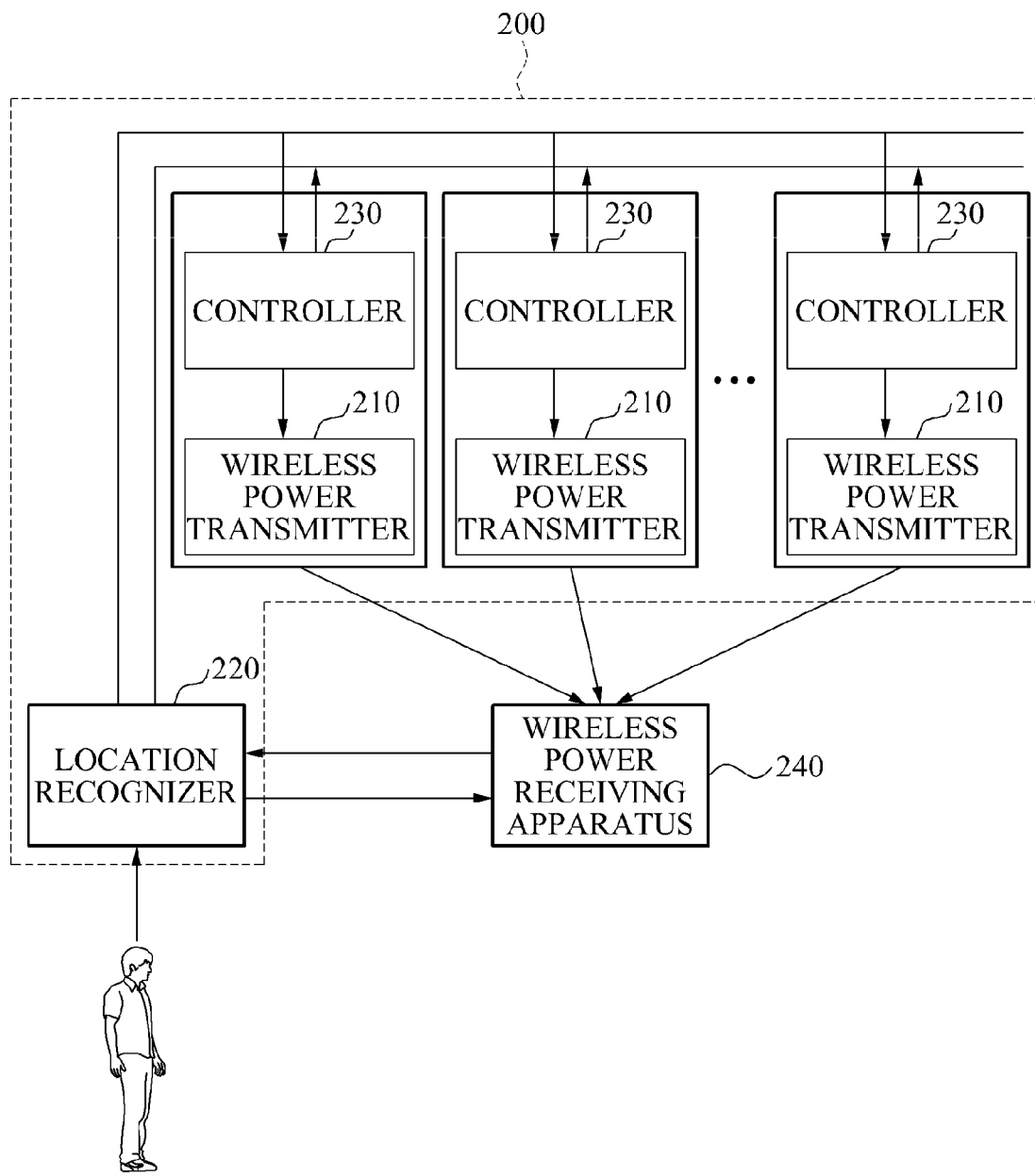
FIG. 2 is a block diagram illustrating a configuration of a wireless power charging apparatus according to another embodiment of the present invention.

FIG. 2 is a block diagram illustrating a configuration of a wireless power charging apparatus 200 according to another embodiment of the present invention.

Referring to FIG. 2, the wireless power charging apparatus 200 may be configured in such a manner that a controller 230 is allocated to each wireless power transmitter 210 to reduce a data processing load of the controller 230 and increase compatibility with respect to various types of the wireless power transmitter 210.

In the wireless power charging apparatus 200 according to the another embodiment of the present invention, the controller 230 may be provided to individual wireless power transmitter 210, and whether to supply power through the wireless power transmitter 210 may be determined in consideration of a location of a wireless power receiving apparatus 240.

The wireless power charging apparatus 200 may include at least one wireless power transmitter 210, a location recognizer 220, and at least one controller 230.

The at least one wireless power transmitter 210 may supply power to the at least one wireless power receiving apparatus 240. The location recognizer 220 may recognize location information of the at least one wireless power receiving apparatus 240.

The at least one controller 230 may be connected to the at least one wireless power transmitter 210, and may determine whether to supply power to the at least one wireless power receiving apparatus 240 by the wireless power transmitter 210.

Figure 3:
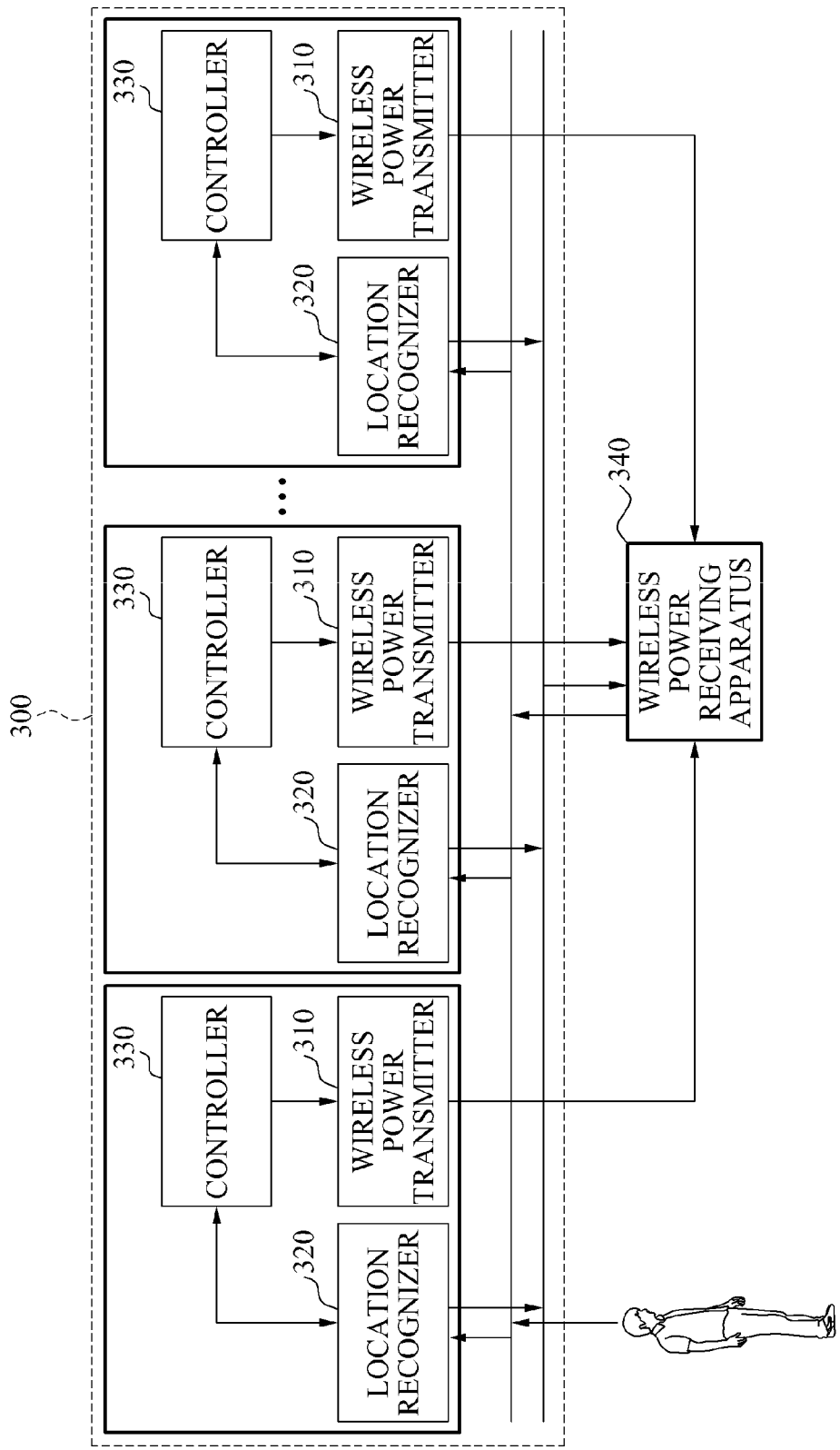
FIG. 3 is a block diagram illustrating a configuration of a wireless power charging apparatus according to still another embodiment of the present invention.

FIG. 3 is a block diagram illustrating a configuration of a wireless power charging apparatus 300 according to still another embodiment of the present invention.

Referring to FIG. 3, the wireless power charging apparatus 300 may operate a location recognizer 320 and a controller 330 for each wireless power transmitter 310. When the wireless power charging apparatus 300 is configured as shown in FIG. 3, location information of only a user and a wireless power receiving apparatus disposed near the wireless power transmitter 310 is necessary. Therefore, a low performance low price device may be applied for the location recognizer 320.

In the wireless power charging apparatus 300 according to the still another embodiment, the location recognizer 320 and the controller 330 may be provided to individual wireless power transmitter 310, and whether to supply power through the wireless power transmitter 310 may be determined in consideration of a location of a wireless power receiving apparatus 340.

The wireless power charging apparatus 300 may include at least one wireless power transmitter 310, at least one location recognizer 320, and at least one controller 330.

The at least one wireless power transmitter 310 may supply power to the at least one wireless power receiving apparatus 340. The at least one location recognizer 320 may be connected to the at least one wireless power transmitter 310 and may recognize location information of the connected wireless power receiving apparatus 310 individually.

The at least one controller 330 may be connected to the at least one wireless power transmitter 310, and may determine whether to supply power to the at least one wireless power receiving apparatus 340 by the wireless power transmitter 310 based on the location information.

Figure 4A:
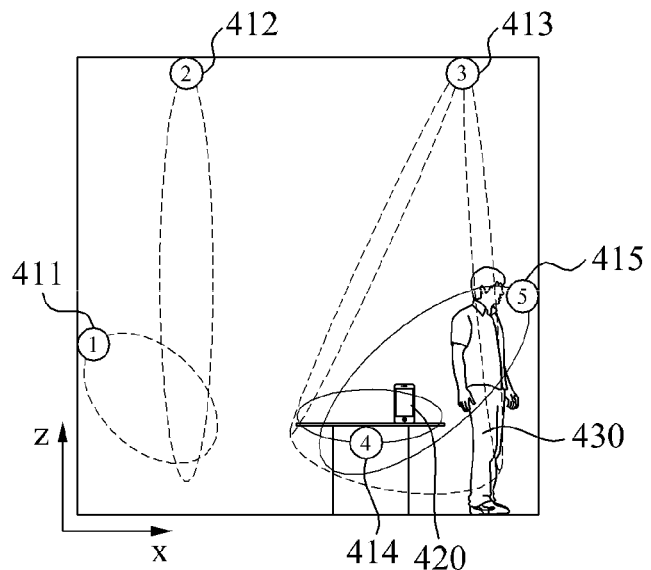
FIGS. 4A and 4B are a side view and a plan view illustrating a wireless power charging apparatus being installed in an indoor space, according to an embodiment of the present invention.
Figure 4B:
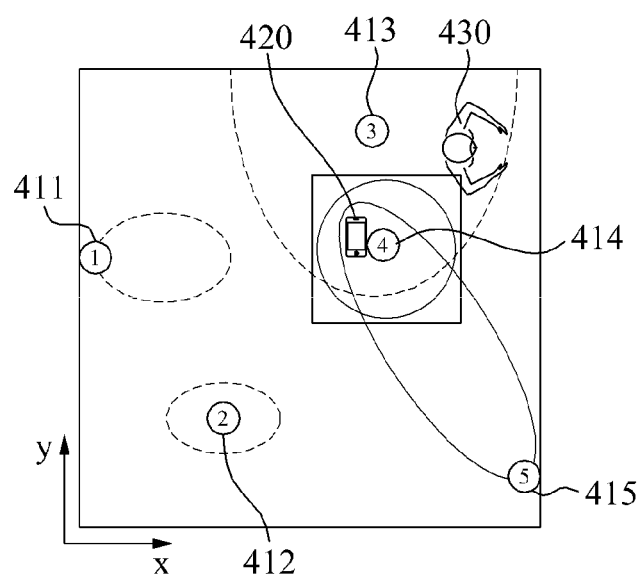

FIGS. 4A and 4B are a side view and a plan view illustrating a wireless power charging apparatus being installed in an indoor space, according to an embodiment of the present invention. For example, the wireless power charging apparatus of FIGS. 4A and 4B include five wireless power transmitters 411 to 415 disposed in an indoor space including a table, and a controlling device including a controller to control the wireless power transmitters 411 to 415.

FIGS. 4A and 4B do not show a controller and a location recognizer to illustrate driving relationships of the wireless power transmitters 411 to 415 according to locations of a wireless power receiving apparatus 420 and a user 430.

A dotted line or a solid line emitted from the wireless power transmitters 411 to 415 indicates a power transmission range calculated by reflecting a result of considering harm to a human body and charging efficiency according to the wireless power transmitters 411 to 415. For example, the dotted line may indicate a power transmission range of when the wireless power transmitters 411 to 415 are in an off state while the solid line may indicate a power transmission range of when the wireless power transmitters 411 to 415 are in an on state.

According to an aspect, when the wireless power receiving apparatus 420 is located within the power transmission range and the user is located beyond the power transmission range, the harm to the human body may be reduced and the charging efficiency may be increased.

The power transmission range may be determined according to capabilities of the wireless power transmitters 411 to 415, the location recognizer, and the controller constituting the wireless power charging apparatus and according to electromagnetic wave influence standard per country. For example, the wireless power transmitters 411 to 415 may have different wireless power transmission characteristics.

In the below, it is presumed that the wireless power transmitters 411, 412, 414, and 415 except the wireless power transmitter 413 have a fixed antenna beam pattern whereas the wireless power transmitter 413 includes a variable beam antenna implemented using an array antenna method.

Referring to FIG. 4, when the user enters the indoor space where the wireless power charging apparatus is installed and puts the wireless power receiving apparatus 420 such as a smart phone, a smart pad, or a notebook on the table, the location recognizer may recognize and track the location of the wireless power receiving apparatus 420.

The wireless power charging apparatus may search for the location of the user actively or based on predetermined information, and obtain information related to a user occupied space that may affect the human body with reference to the location information of the user.

The location information may be transmitted to the controller. The controller may set the wireless power charging environment, for example by determining a wireless power transmitter to transmit power, in consideration of the charging efficiency, the influence to the human body, and the like according to an algorithm.

An area where the wireless power receiving apparatus 420 is located within a wireless power charging area may correspond to an installation area of the wireless power transmitters 411 to 415. However, the wireless power charging apparatus may control wireless power transmission to be performed through the wireless power transmitters 414 and 415 in consideration of the influence to the human body.

Here, the wireless power charging apparatus may increase the charging efficiency by driving the wireless power transmitters 414 and 415 simultaneously. When another wireless power receiving apparatus overlaps with the wireless power transmitters 414 and 415, only one of the wireless power transmitters 414 and 415 may be used whereas a remaining wireless power transmitter transmits wireless power to a newly entered wireless power receiving apparatus.

Figure 5A:
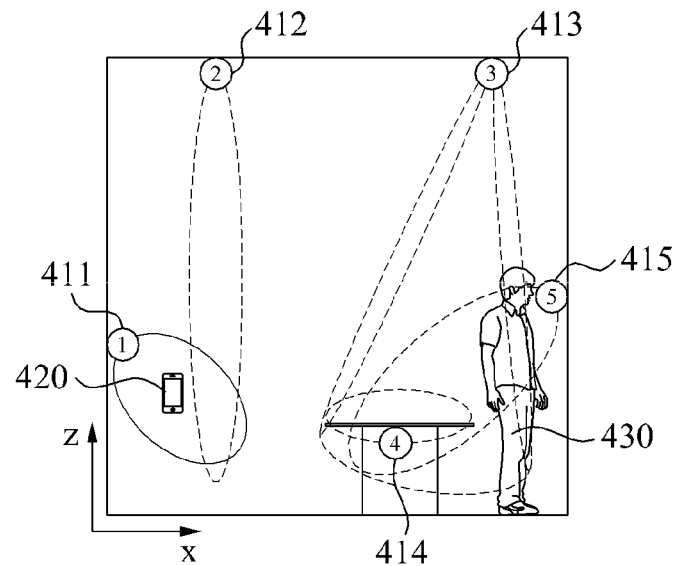
FIGS. 5A and 5B are diagrams illustrating an example in which a location of a wireless power charging apparatus is changed without a change in a location of a user in a wireless power charging environment as shown in FIG. 4, according to an embodiment of the present invention.
Figure 5B:
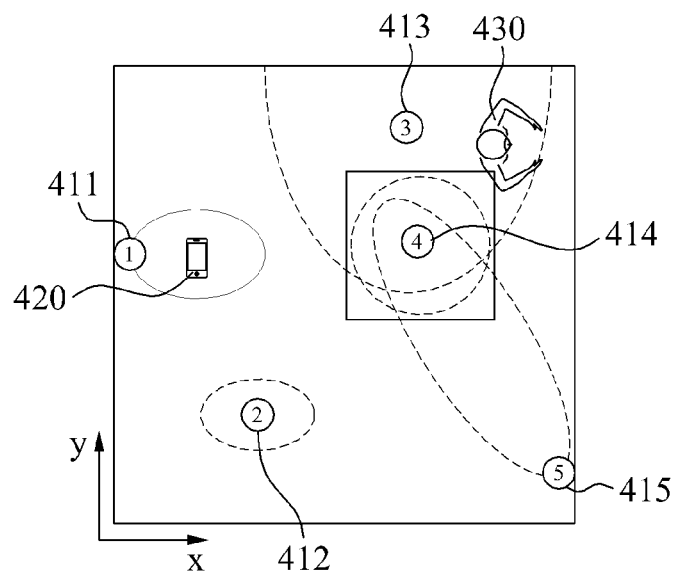

FIGS. 5A and 5B are diagrams illustrating an example in which a location of a wireless power charging apparatus is changed without a change in a location of a user in the wireless power charging environment of FIG. 4.

Referring to FIGS. 5A and 5B, the wireless power charging apparatus may track location information of the wireless power receiving apparatus 420 and the user 430 again when the location of the wireless power receiving apparatus 420 is changed without a change in the location of the user 430. In addition, the wireless power charging apparatus may stop wireless power transmission of the wireless power transmitters 414 and 415 based on the tracked location information, and transmit wireless power to the wireless power receiving apparatus 420 by driving the wireless power transmitter 411.

Hereinafter, a wireless power charging method according to the change in the wireless power charging environment as described with reference to FIGS. 4A to 5B will be explained.

Figure 6:
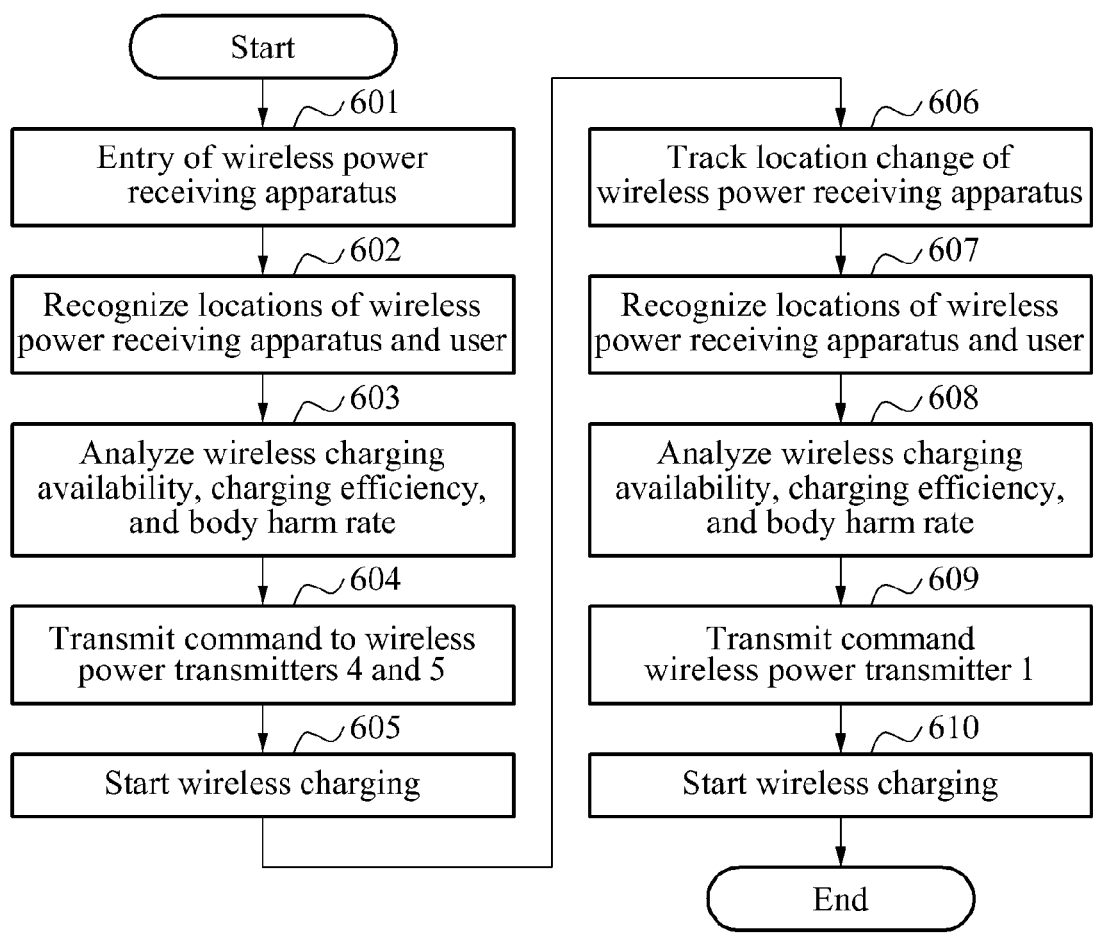
FIG. 6 is a flowchart illustrating a wireless power charging method according to a change in the wireless power charging environment of FIGS. 4A to 5b, according to an embodiment of the present invention.

FIG. 6 is a flowchart illustrating a wireless power charging method according to a change in the wireless power charging environment of FIGS. 4A to 5b, according to an embodiment of the present invention.

Referring to FIG. 6, the wireless power charging apparatus may detect an entry of the wireless power receiving apparatus 420 in operation 601, and recognize the locations of the wireless power receiving apparatus 420 and the user 430 in operation 602.

In operation 603, the wireless power charging apparatus may check whether wireless power charging of the wireless power receiving apparatus 420 is available and may analyze the charging efficiency and the body harm rate based on the locations of the wireless power receiving apparatus 420 and the user 430.

In operation 604, the wireless power charging apparatus may transmit the wireless power charging command to the wireless power transmitters 414 and 415 in consideration of the charging efficiency and the body harm rate. In operation 605, the wireless power charging apparatus may start wireless power charging of the wireless power receiving apparatus 420 through the wireless power transmitters 414 and 415.

When the location of the wireless power receiving apparatus 420 is changed as shown in FIG. 5, the wireless power charging apparatus may track the location change of the wireless power receiving apparatus 420 in operation 606, and may recognize the locations of the wireless power receiving apparatus 420 and the user 430 again in operation 607.

In operation 608, the wireless power charging apparatus may check wireless power charging availability of the wireless power receiving apparatus 420 again and may analyze the charging efficiency and the body harm rate again based on the locations of the wireless power receiving apparatus 420 and the user 430.

The wireless power charging apparatus may transmit the wireless power charging command to the wireless power transmitter 411 in consideration of the charging efficiency and the body harm rate in operation 609, and may restart wireless power charging of the wireless power receiving apparatus 420 through the wireless power transmitter 411 in operation 610.

Hereinafter, a case in which the location of the user is changed without a change in the location of the wireless power receiving apparatus will be described.

Figure 7A:
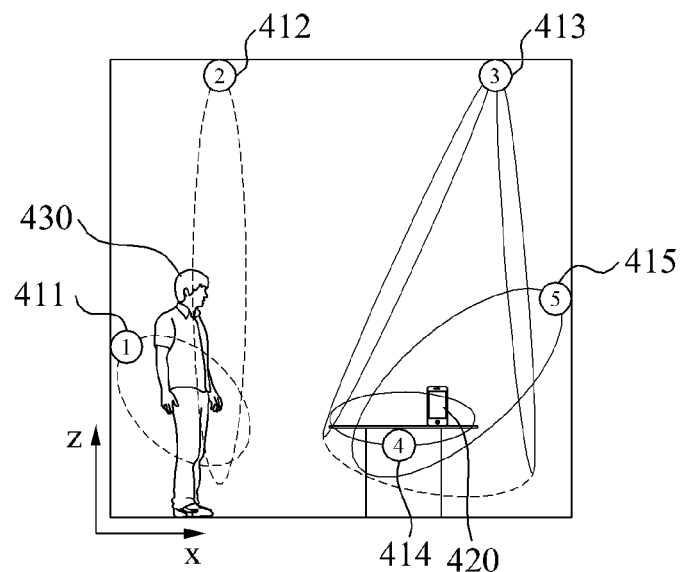
FIGS. 7A and 7B are diagrams illustrating an example in which the location of the user is changed without a change in the location of the wireless power charging apparatus in the wireless power charging environment as shown in FIG. 4, according to an embodiment of the present invention.
Figure 7B:
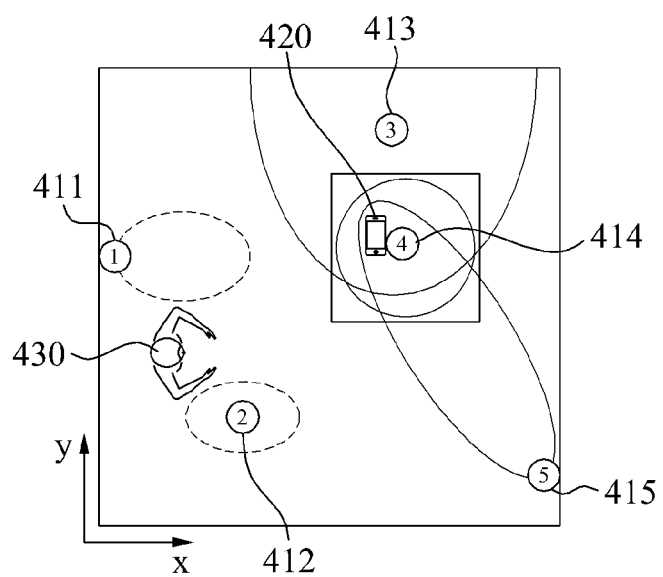

FIGS. 7A and 7B are diagrams illustrating an example in which the location of the user is changed without a change in the location of the wireless power charging apparatus in the wireless power charging environment as shown in FIG. 4, according to an embodiment of the present invention.

Referring to FIGS. 7A and 7B, when the user moves to beyond the power transmission range of the wireless power transmitter 414, the wireless power charging apparatus may additionally transmit wireless power to the wireless power receiving apparatus 420 by driving the wireless power transmitter 413, to increase the charging efficiency.

In an example, when the location of the user 430 is changed without a change in the location of the wireless power receiving apparatus 420, the wireless power charging apparatus may track the location information of the wireless power receiving apparatus 420 and the user 430 again, and transmit wireless power to the wireless power receiving apparatus 420 by additionally driving the wireless power transmitter 413 based on the tracked location information.

The wireless power charging method according to the change in the wireless power charging environment as shown in FIGS. 4A, 4B, and 7 will be described hereinafter.

Figure 8:
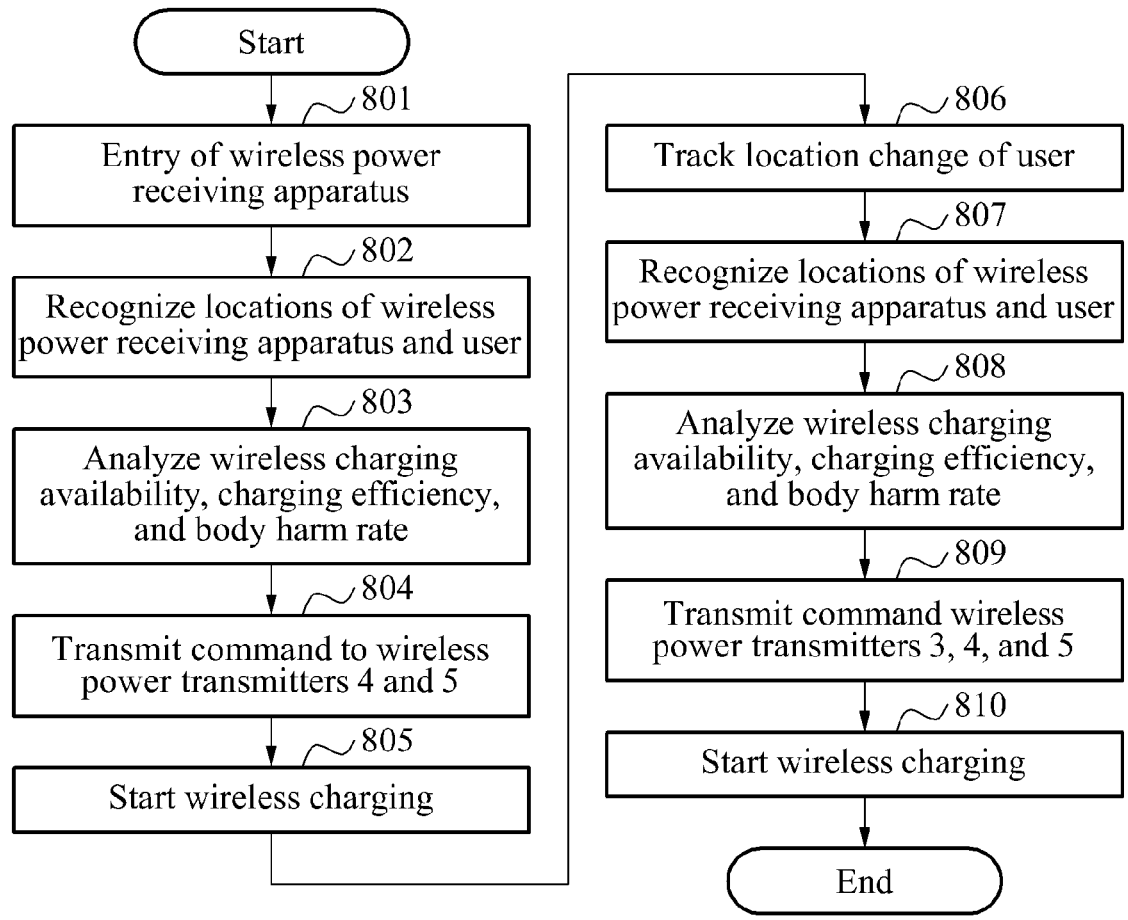
FIG. 8 is a flowchart illustrating a wireless power charging method according to a change in the wireless power charging environments of FIGS. 4A, 4B, and 7, according to an embodiment of the present invention.

FIG. 8 is a flowchart illustrating a wireless power charging method according to a change in the wireless power charging environments of FIGS. 4A, 4B, and 7, according to an embodiment of the present invention.

Referring to FIG. 8, the wireless power charging apparatus may detect an entry of the wireless power receiving apparatus 420 in operation 801, and recognize the locations of the wireless power receiving apparatus 420 and the user 430 in operation 802.

In operation 803, the wireless power charging apparatus may check wireless power charging availability of the wireless power receiving apparatus 420 and may analyze the charging efficiency and the body harm rate based on the locations of the wireless power receiving apparatus 420 and the user 430.

The wireless power charging apparatus may transmit the wireless power charging command to the wireless power transmitters 414 and 415 in consideration of the charging efficiency and the body harm rate in operation 804, and may start wireless power charging of the wireless power receiving apparatus 420 through the wireless power transmitters 414 and 415 in operation 805.

When the location of the user 430 is changed as shown in FIGS. 7A and 7B, the wireless power charging apparatus may track the location change of the user 430 in operation 806, and may recognize the locations of the wireless power receiving apparatus 420 and the user 430 again in operation 807.

In operation 808, the wireless power charging apparatus may check power charging availability of the wireless power receiving apparatus 420 again and may analyze the charging efficiency and the body harm rate again based on the locations of the wireless power receiving apparatus 420 and the user 430.

The wireless power charging apparatus may transmit the wireless power charging command to the wireless power transmitter 413 in consideration of the charging efficiency and the body harm rate in operation 809, and may restart wireless power charging of the wireless power receiving apparatus 420 through the wireless power transmitter 413, 414, and 415 in operation 810.

Hereinafter, a wireless power charging method according to an embodiment of the present invention will be described.

The wireless power charging method may be performed by the aforementioned wireless power charging apparatus.

Figure 9:
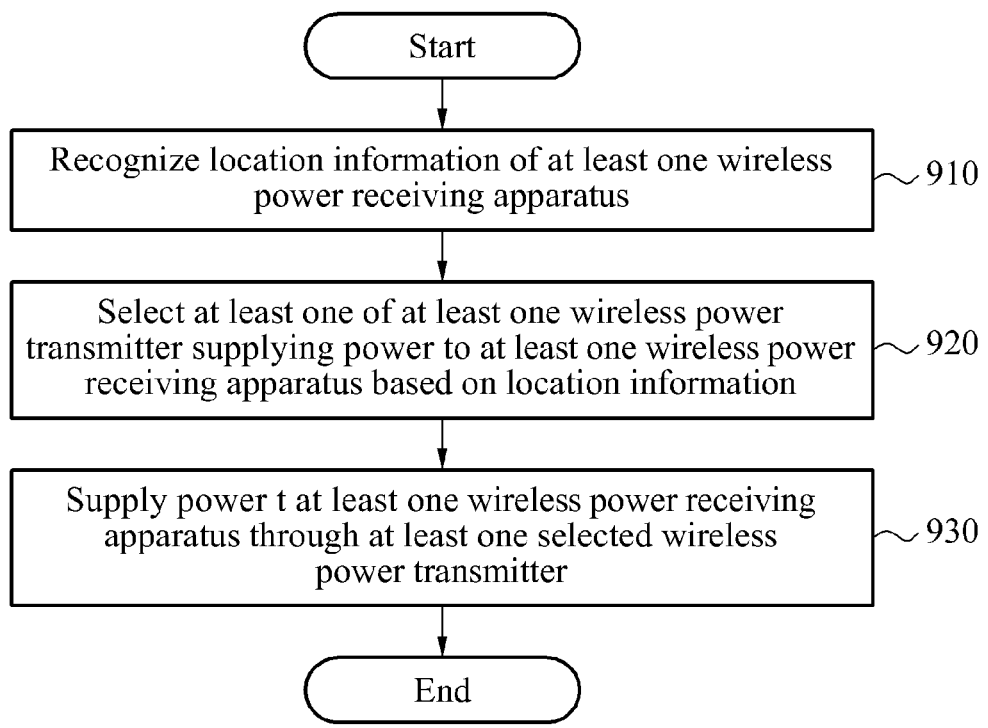
FIG. 9 is a flowchart illustrating a wireless power charging method according to an embodiment of the present invention.

FIG. 9 is a flowchart illustrating a wireless power charging method according to an embodiment of the present invention.

Referring to FIG. 9, the wireless power charging apparatus may recognize location information of at least one wireless power receiving apparatus in operation 910, and select at least one of at least one wireless power transmitter that supplies power to the at least one wireless power receiving apparatus based on the location information in operation 920. The wireless power charging apparatus may supply power to the at least wireless power receiving apparatus through the at least one selected wireless power transmitter in operation 930.

The wireless power charging apparatus may analyze capability information of the at least one wireless power receiving apparatus, and select at least one of the at least one wireless power transmitter based on the analysis result.

For example, the wireless power charging apparatus may analyze the charging efficiency and the body harm rate of the at least one wireless power transmitter based on the capability information, and select at least one of the at least one wireless power transmitter in consideration of the charging efficiency and the body harm rate.

The wireless power charging apparatus may select at least one of the at least one wireless power transmitter so that the charging efficiency is maximized or so that the body harm rate is minimized.

In addition, the wireless power charging apparatus may monitor whether the location information is changed according to a movement of the wireless power receiving apparatus. When the location information is changed, the wireless power charging apparatus may select at least one of the at least one wireless power transmitter again based on the changed location information.

The wireless power charging apparatus may analyze environment information of the wireless power receiving apparatus and, when the environment information is changed, may select at least one of the at least one wireless power transmitter again in consideration of the changed environment information.

Hereinafter, a wireless power charging method that determines whether to supply power of the wireless power transmitter individually provided with a controller, in consideration of the location of the wireless power receiving apparatus will be described.

Figure 10:
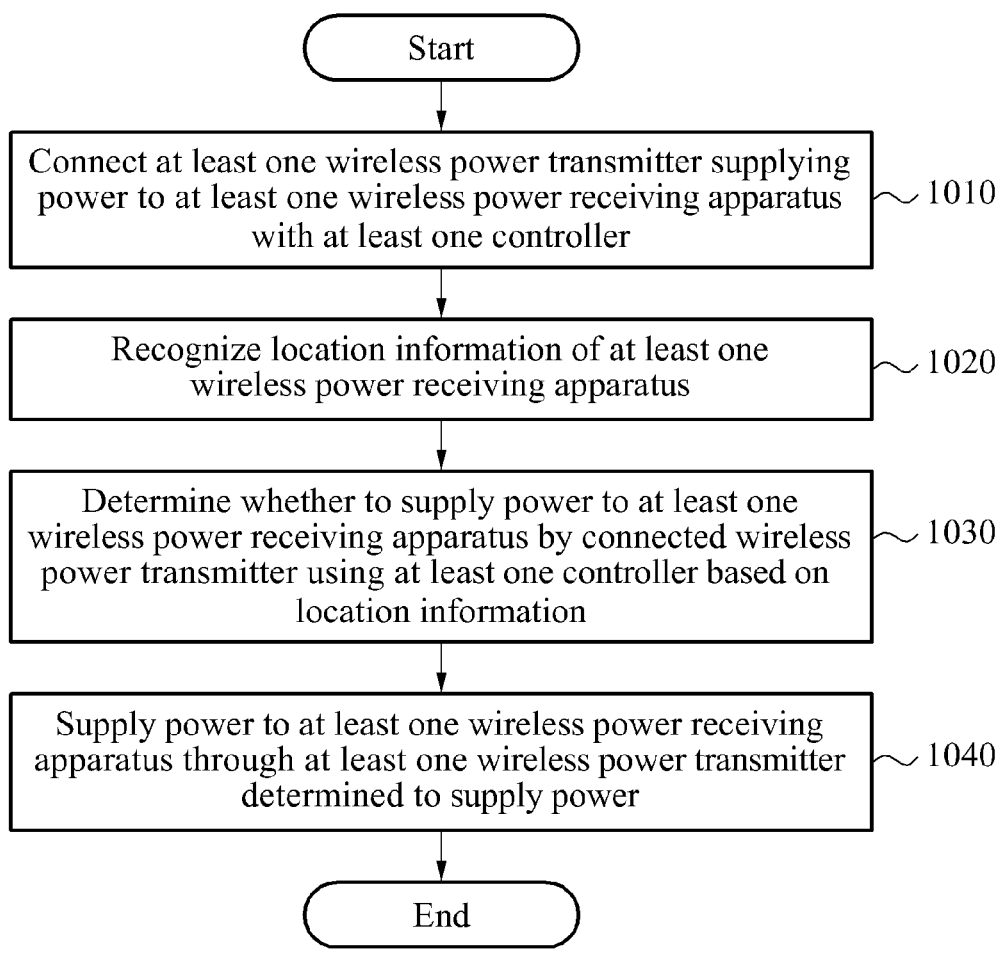
FIG. 10 is a flowchart illustrating a wireless power charging method according to another embodiment of the present invention.

FIG. 10 is a flowchart illustrating a wireless power charging method according to another embodiment of the present invention.

Referring to FIG. 10, in operation 1010, the wireless power charging apparatus may connect at least one wireless power transmitter that supplies power to the at least one wireless power receiving apparatus with at least one controller.

The wireless power charging apparatus may recognize location information of the at least one wireless power receiving apparatus in operation 1020, and determine whether to supply power to the at least one wireless power receiving apparatus by the connected wireless power transmitter using the at least one controller based on the location information in operation 1030.

In operation 1040, the wireless power charging apparatus may supply power to the at least one wireless power receiving apparatus through the at least one wireless power transmitter determined to supply power.

Hereinafter, a wireless power charging method that determines whether to supply power of the wireless power transmitter, which is individually provided with a location recognizer and a controller, in consideration of the location of the wireless power receiving apparatus will be described.

Figure 11:
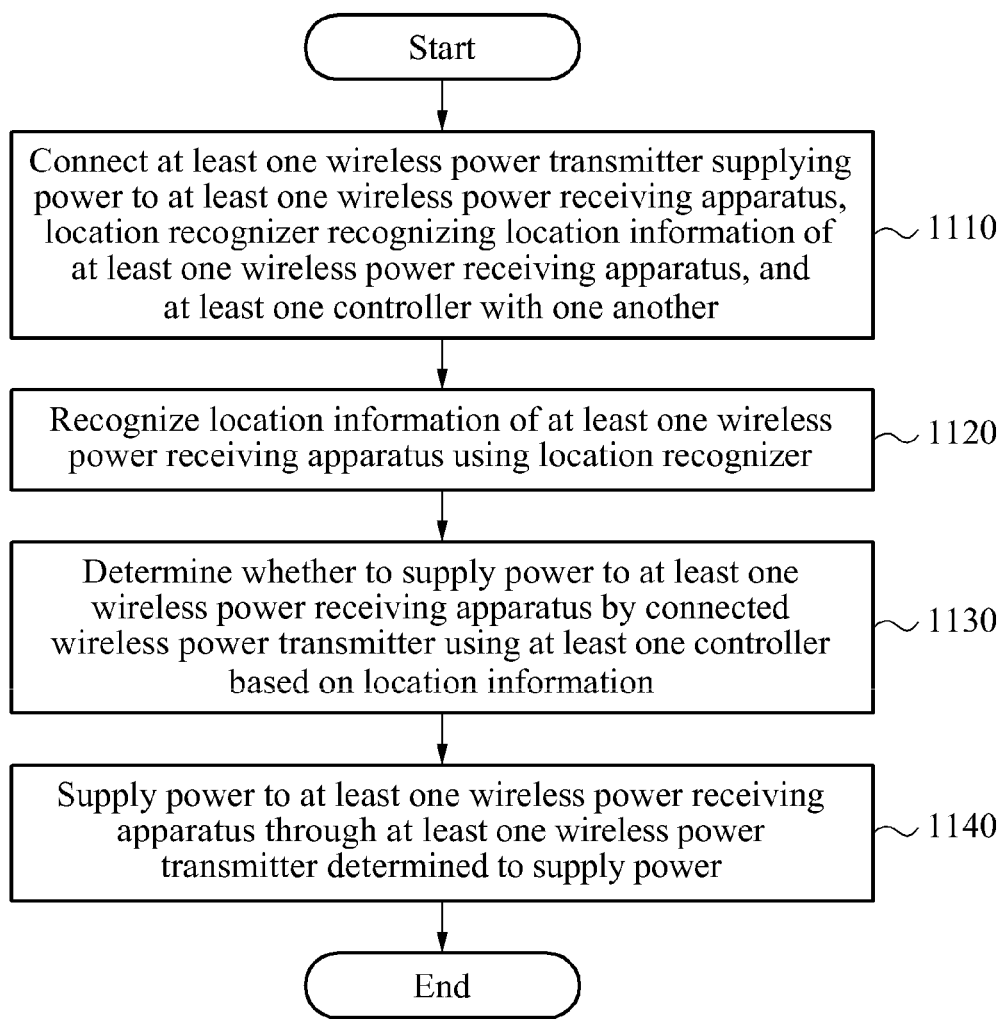
FIG. 11 is a flowchart illustrating a wireless power charging method according to still another embodiment of the present invention.

FIG. 11 is a flowchart illustrating a wireless power charging method according to still another embodiment of the present invention.

Referring to FIG. 11, in operation 1110, the wireless power charging apparatus may connect at least one wireless power transmitter that supplies power to at least one wireless power receiving apparatus, a location recognizer that recognizes location information of the at least one wireless power receiving apparatus, and at least one controller with one another.

In operation 1120, the wireless power charging apparatus may recognize the location information of the at least one wireless power receiving apparatus using the location recognizer. In operation 1130, the wireless power charging apparatus may determine whether to supply power to the at least one wireless power receiving apparatus by the connected wireless power transmitter using at least one controller based on the location information.

In operation 1140, the wireless power charging apparatus may supply power to at least one wireless power receiving apparatus through the at least one wireless power transmitter determined to supply power.

According to embodiments of the present invention, a charging receiving terminal may be charged through recognition of a location of a user and a location of the charging receiving terminal.

Additionally, according to embodiments of the present invention, user convenience of a wireless power charging service and wireless power charging efficiency may be increased while an influence of radio waves of wireless power affecting a human body may be reduced.

Additionally, according to embodiments of the present invention, various wireless power charging methods may be applied in a combined manner.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A wireless power charging apparatus comprising:
   at least one wireless power transmitter to supply power to at least one wireless power receiving apparatus;
   a location recognizer to recognize location information of the at least one wireless power receiving apparatus; and
   a controller to select at least one of the at least one wireless power transmitter based on the location information, and control the at least one selected wireless power transmitter to supply power to the at least one wireless power receiving apparatus,
   wherein the controller analyzes at least one of charging efficiency and a body harm rate of the at least one wireless power transmitter based on the location information, and selects at least one of the at least one wireless power transmitter based on an analysis result.

2. The wireless power charging apparatus of claim 1, wherein the location recognizer recognizes a change in the location information by a real time polling method or an interrupt method.

3. The wireless power charging apparatus of claim 1, wherein the location recognizer recognizes the location information using near frequency communication (NFC), image recognition, a piezoelectric and electric field change sensor, triangulation using a wireless local area network (WLAN), and global positioning system (GPS) information.

4. The wireless power charging apparatus of claim 1, wherein the controller further analyzes capability information of the at least one wireless power transmitter and selects at least one of the at least one wireless power transmitter based on an analysis result.

5. The wireless power charging apparatus of claim 1, wherein the controller selects at least one of the at least one wireless power transmitter so that the charging efficiency is maximized.

6. The wireless power charging apparatus of claim 1, wherein the controller selects at least one of the at least one wireless power transmitter so that the body harm rate is minimized.

7. The wireless power charging apparatus of claim 1, wherein the controller monitors whether the location information is changed according to a movement of the wireless power receiving apparatus, and selects at least one of the at least one wireless power transmitter again based on the changed location information when the location information is changed.

8. The wireless power charging apparatus of claim 1, wherein the controller analyzes environment information of the wireless power receiving apparatus, and selects at least one of the at least one wireless power transmitter again in consideration of the changed environment information when the environment information is changed.

9. A wireless power charging apparatus comprising:
at least one wireless power transmitter to supply power to at least one wireless power receiving apparatus;
a location recognizer to recognize location information of the at least one wireless power receiving apparatus; and
at least one controller connected to the at least one wireless power transmitter,
wherein the at least one controller analyzes at least one of charging efficiency and a body harm rate of the at least one wireless power transmitter based on the location information and determines whether to supply power to the at least one wireless power receiving apparatus by the connected wireless power transmitter based on the analysis result.

10. A wireless power charging apparatus comprising:
at least one wireless power transmitter to supply power to at least one wireless power receiving apparatus;
at least one location recognizer connected to the at least one wireless power transmitter to recognize location information of the connected wireless power receiving apparatus individually; and
at least one controller connected to the at least one wireless power transmitter,
wherein the at least one controller analyzes at least one of charging efficiency and a body harm rate of the at least one wireless power transmitter based on the location information and determines whether to supply power to the at least one wireless power receiving apparatus by the connected wireless power transmitter based on the analysis result.

11. A wireless power charging method comprising:
recognizing location information of at least one wireless power receiving apparatus;
analyzing at least one of charging efficiency and a body harm rate of at least one wireless power transmitter based on the location information;
selecting at least one of the at least one wireless power transmitter that supplies power to the at least one wireless power receiving apparatus based on an analysis result; and
supplying power to the at least one wireless power receiving apparatus through the at least one selected wireless power transmitter.

12. The wireless power charging method of claim 11, further comprising:
analyzing the capability information of the at least one wireless power transmitter; and
selecting at least one of the at least one wireless power transmitter based on an analysis result.

13. The wireless power charging method of claim 11, further comprising:
selecting at least one of the wireless power transmitter so that the charging efficiency is maximized.

14. The wireless power charging method of claim 11, further comprising:
selecting at least one of the at least one wireless power transmitter so that the body harm rate is minimized.

15. The wireless power charging method of claim 11, further comprising:
monitoring whether the location information is changed according to a movement of the wireless power receiving apparatus; and
selecting at least one of the at least one wireless power transmitter again according to the changed location information when the location information is changed.

16. The wireless power charging method of claim 11, further comprising:
analyzing environment information of the wireless power receiving apparatus, and selects at least one of the at least one wireless power transmitter again in consideration of the changed environment information when the environment information is changed.

17. A wireless power charging method comprising:
connecting at least one wireless power transmitter which supplies power to at least one wireless power receiving apparatus with at least one controller;
recognizing location information of the at least one wireless power receiving apparatus;
analyzing at least one of charging efficiency and a body harm rate of the at least one wireless power transmitter based on the location information;
determining whether to supply power to the at least one wireless power receiving apparatus by the connected wireless power transmitter using the at least one controller based on an analysis result; and
supplying power to the at least one wireless power receiving apparatus through the at least one wireless power transmitter determined to supply power.

18. A wireless power charging method comprising:
connecting at least one wireless power transmitter to supply power to at least one wireless power receiving apparatus, a location recognizer to recognize location information of the at least one wireless power receiving apparatus, and at least one controller with one another;
recognizing the location information of the at least one wireless power receiving apparatus using the location recognizer;
analyzing at least one of charging efficiency and a body harm rate of the at least one wireless power transmitter based on the location information;
determining whether to supply power to the at least one wireless power receiving apparatus by the connected wireless power transmitter using the at least one controller based on an analysis result; and
supplying power to the at least one wireless power receiving apparatus through the at least one wireless power transmitter determined to supply power.

* * * * *